US011625658B2

United States Patent
Ingle

(10) Patent No.: US 11,625,658 B2
(45) Date of Patent: Apr. 11, 2023

(54) METHOD FOR SYNCHRONOUS COMMUNICATION TO PROCURE, SCHEDULE, COORDINATE, AND DELIVER MATERIALS TO A PLURALITY OF CONSTRUCTION PROJECTS AUTOMATICALLY USING A CALENDAR MODEL

(71) Applicant: Michael Ingle, Cornith, TX (US)

(72) Inventor: Michael Ingle, Cornith, TX (US)

( * ) Notice: Subject to any disclaimer, the term of this patent is extended or adjusted under 35 U.S.C. 154(b) by 0 days.

(21) Appl. No.: 16/216,607

(22) Filed: Dec. 11, 2018

(65) Prior Publication Data

US 2019/0114568 A1    Apr. 18, 2019

Related U.S. Application Data

(60) Provisional application No. 62/571,930, filed on Oct. 13, 2017.

(51) Int. Cl.
*G06Q 10/06* (2012.01)
*G06Q 10/0631* (2023.01)
(Continued)

(52) U.S. Cl.
CPC ....... *G06Q 10/06315* (2013.01); *G06F 16/29* (2019.01); *G06Q 10/06313* (2013.01);
(Continued)

(58) Field of Classification Search
CPC .......... G06Q 10/06315; G06Q 10/063; G06Q 10/06313; G06Q 10/06314; G06Q 10/0835; G06Q 50/08; G06F 16/29
See application file for complete search history.

(56) References Cited

U.S. PATENT DOCUMENTS

| 8,738,414 | B1 * | 5/2014 | Nagar | G06Q 10/103 |
| | | | | 705/7.12 |
| 9,951,535 | B2 * | 4/2018 | Degaray | B28C 7/0418 |
| 2002/0035451 | A1 * | 3/2002 | Rothermel | G06F 30/00 |
| | | | | 703/1 |

(Continued)

FOREIGN PATENT DOCUMENTS

AU       2015101964    *  2/2015   ............. G06Q 50/08

OTHER PUBLICATIONS

I. Yap, Jeffrey Boon Hui, Hamzah Abdul-Rahman, and Wang Chen. "Collaborative model: Managing design changes with reusable project experiences through project learning and effective communication." International Journal of Project Management 35.7 (2017): 1253-1271. (Year: 2017).*

(Continued)

*Primary Examiner* — Patricia H Munson
*Assistant Examiner* — Hamzeh Obaid
(74) *Attorney, Agent, or Firm* — Daniel J. Chalker; Chalker Flores, LLP

(57) ABSTRACT

A method using synchronous communication to procure, schedule, coordinate, and deliver materials to a plurality of construction projects with a Calendar Model while using an administrative processor with administrative computer readable media connected to a global communication network and client devices for a plurality of suppliers, a plurality of consultants, a plurality of contractors, and a plurality of administrators. The method includes creating a supplier profile, a contractor profile a consultant profile, construction project and an administrative profile in the geographic database.

16 Claims, 16 Drawing Sheets

(51) Int. Cl.
  *G06Q 50/08* (2012.01)
  *G06F 16/29* (2019.01)
  *G06Q 10/0835* (2023.01)

(52) U.S. Cl.
  CPC ............ *G06Q 10/06314* (2013.01); *G06Q 10/0835* (2013.01); *G06Q 50/08* (2013.01)

(56) References Cited

U.S. PATENT DOCUMENTS

| | | | | |
|---|---|---|---|---|
| 2004/0071043 | A1* | 4/2004 | Aizawa | G06Q 10/06 366/1 |
| 2005/0144894 | A1* | 7/2005 | Grimes | G06Q 30/018 52/741.1 |
| 2008/0120129 | A1* | 5/2008 | Seubert | G06Q 40/125 705/305 |
| 2008/0126265 | A1* | 5/2008 | Livesay | G06Q 30/0637 705/80 |
| 2009/0063177 | A1* | 3/2009 | East | G06Q 50/01 705/319 |
| 2009/0276273 | A1* | 11/209 | McIntosh | G06Q 10/063114 715/810 |
| 2010/0125482 | A1* | 5/2010 | Burke | G06Q 10/06 705/7.42 |
| 2013/0132440 | A1* | 5/2013 | Carlson | H04L 67/306 707/792 |
| 2016/0071033 | A1* | 3/2016 | Davis | G06Q 10/0832 705/7.15 |
| 2017/0091685 | A1* | 3/2017 | Karabin | G06Q 50/08 |

OTHER PUBLICATIONS

Nitithamyong, Pollaphat, and Mirosław J. Skibniewski. "Web-based construction project management systems: how to make them successful?." Automation in construction 13.4 (2004): 491-506. (Year: 2004).*

* cited by examiner

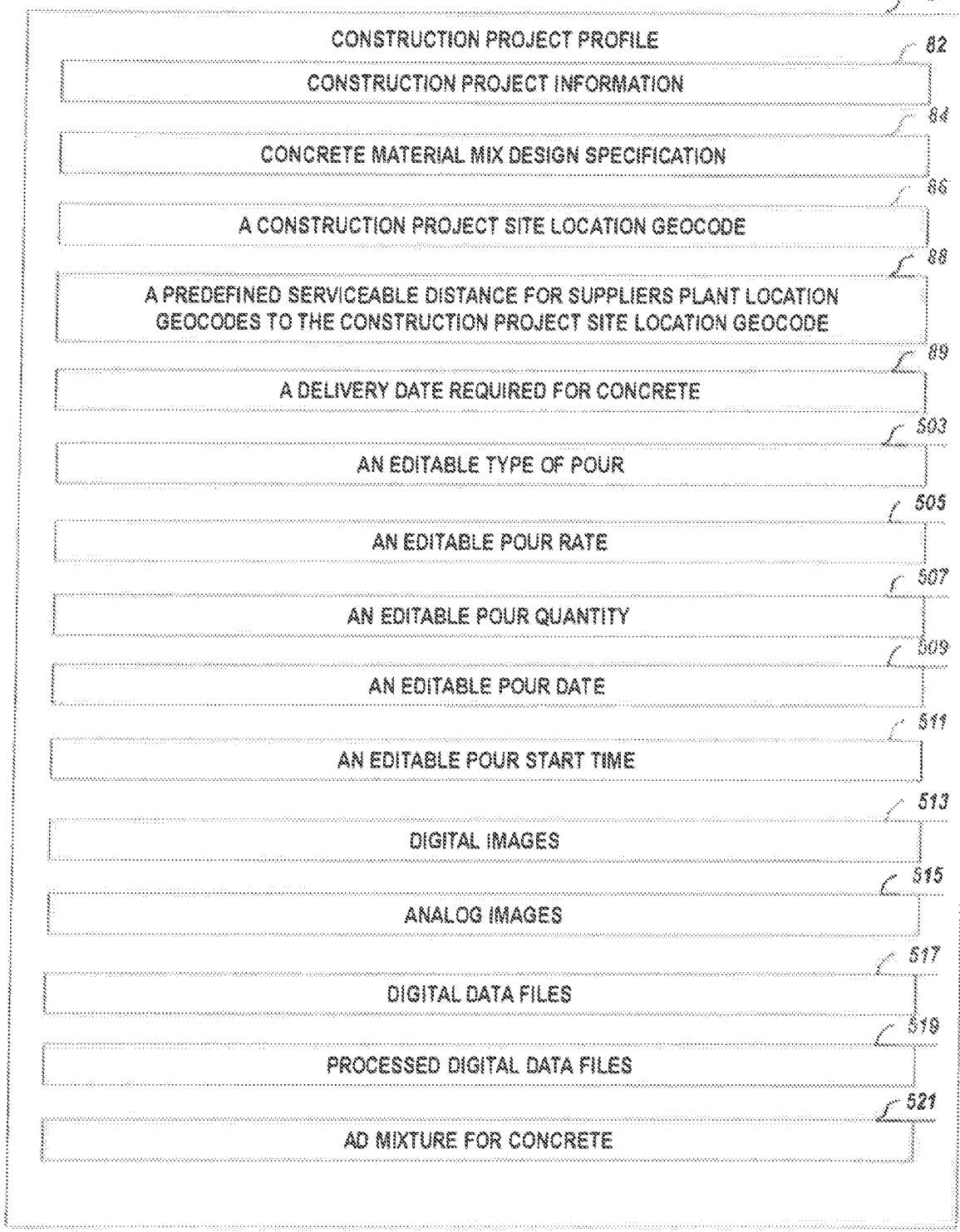

FIG. 5B

CONSTRUCTION PROJECT PROFILE

POUNDS PER SQUARE INCH (PSI)

PROJECT SPECIFIC NOTES

PROJECT SPECIFIC MESSAGES

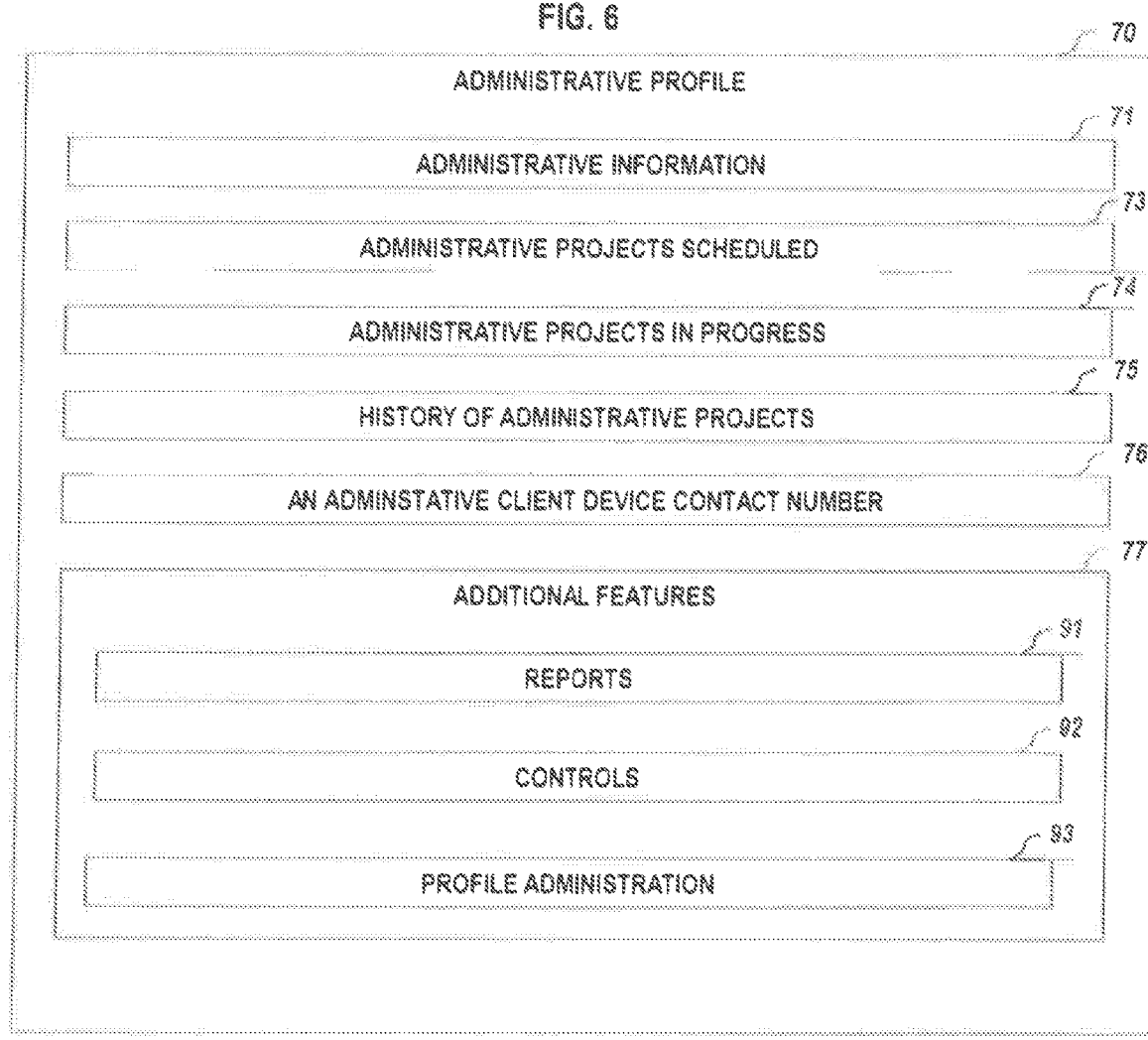

FIG. 7A

*200* — CREATING A SUPPLIER PROFILE IN A GEOGRAPHIC DATABASE FOR EACH OF THE PLURALITY OF SUPPLIERS IN THE ADMINISTRATIVE COMPUTER READABLE MEDIA

*201* — INPUTTING A SUPPLIER POUR RATING FOR EACH SUPPLIER INTO EACH SUPPLIER PROFILE

*202* — CREATING A CONTRACTOR PROFILE IN THE GEOGRAPHIC DATABASE FOR EACH OF THE PLURALITY OF CONTRACTORS

*203* — INPUTTING A CONTRACTOR POUR RATING FOR EACH CONTRACTOR INTO EACH CONTRACTOR PROFILE

*204* — CREATING A CONSULTANT PROFILE IN THE GEOGRAPHIC DATABASE FOR EACH OF THE PLURALITY OF CONSULTANTS

*205* — INPUTTING A CONSULTANT POUR RATING FOR EACH CONSULTANT INTO EACH CONSULTANT PROFILE

*210* — VERIFYING INFORMATION OF EACH CREATED SUPPLIER PROFILE, CONTRACTOR PROFILE, CONSULTANT PROFILE AND INSERTING AN ACCOUNT APPROVAL

*220* — CREATING A PLURALITY OF CONSTRUCTION PROJECT PROFILES IN THE GEOGRAPHIC DATABASE AND LINKING EACH CONSTRUCTION PROJECT PROFILE TO A CONTRACTOR PROFILE

*230* — COMPARING THE CONSTRUCTION PROJECT SITE LOCATION GEOCODE TO EACH SUPPLIER LOCATION GEOCODE AND GENERATING A GEOGRAPHIC LIST OF SUPPLIER PROFILES WITHIN THE PREDEFINED SERVICEABLE DISTANCE TO THE CONSTRUCTION PROJECT SITE LOCATION GEOCODE

*240* — TRANSMITTING THE GEOGRAPHIC LIST OF SUPPLIER PROFILES TO EACH CONTRACTOR CLIENT DEVICE CONTACT NUMBER THAT MATCHES THE PREDEFINED SERVICEABLE DISTANCE

FIG. 7B

- 250 — COMPARING EACH DELIVERY DATE REQUIRED FOR CONCRETE TO EACH CONTRACTOR'S CURRENT CONSTRUCTION PROJECT DATES AND GENERATING A CHRONOLOGICAL LIST FROM THE GEOGRAPHIC LIST OF SUPPLIER PROFILES THAT HAVE AVAILABILITY ON A DELIVERY DATE REQUIRED FOR CONCRETE
- 252 — TRANSMITTING THE CHRONOLOGICAL LIST OF SUPPLIER PROFILES TO EACH CONTRACTOR CLIENT DEVICE CONTACT NUMBER
- 254 — TRANSMITTING THE CHRONOLOGICAL LIST OF CONSTRUCTION PROJECT PROFILES TO EACH SUPPLIER CLIENT DEVICE CONTACT NUMBER
- 262 — COMPARING POUR RATINGS OF EACH CONTRACTOR PROFILE AND FORMING A LIST OF CONTRACTOR PROFILES FROM HIGHEST TO LOWEST POUR RATING
- 263 — TRANSMITTING THE LIST OF CONTRACTOR PROFILES FROM HIGHEST TO LOWEST POUR RATING TO AT LEAST ONE OF THE PLURALITY OF SUPPLIER PROFILES, THE PLURALITY OF CONSULTANT PROFILES, AND THE PLURALITY OF CONSTRUCTION PROJECT PROFILES
- 264 — COMPARING POUR RATINGS OF EACH CONSULTANT PROFILE AND FORMING A LIST OF CONSULTANT PROFILES FROM HIGHEST TO LOWEST POUR RATING
- 265 — TRANSMITTING THE LIST OF CONSULTANT PROFILES FROM HIGHEST TO LOWEST POUR RATING TO AT LEAST ONE OF: THE PLURALITY OF SUPPLIER PROFILES, THE PLURALITY OF CONSULTANT PROFILES AND THE PLURALITY OF CONSTRUCTION PROJECT PROFILES
- 266 — COMPARING SUPPLIER POUR RATINGS OF EACH SUPPLIER PROFILE AND FORMING A LIST OF SUPPLIER PROFILES FROM HIGHEST TO LOWEST POUR RATING
- 269 — TRANSMITTING THE LIST OF SUPPLIER PROFILES FROM HIGHEST TO LOWEST POUR RATING TO AT LEAST ONE OF THE PLURALITY OF CONSULTANT PROFILES, THE PLURALITY OF CONTRACTOR PROFILES, AND THE PLURALITY OF CONSTRUCTION PROJECT PROFILES
- 270 — MATCHING A SUPPLIER PROFILE TO A CONSTRUCTION PROJECT PROFILE AND AUTOMATICALLY INPUTTING SUPPLIER MIX DESIGNS INTO EACH CONSTRUCTION PROJECT PROFILE

FIG. 7C

- 271 — INPUTTING A PASSWORD INTO EACH PROFILE
- 272 — PROVIDING A VERIFICATION CODE VIA TEXT MESSAGE OR EMAIL TO RESET A PASSWORD AND ACCESS A PROFILE WHEN A USER ASSOCIATED WITH A PROFILE SELECTS "FORGOT PASSWORD"

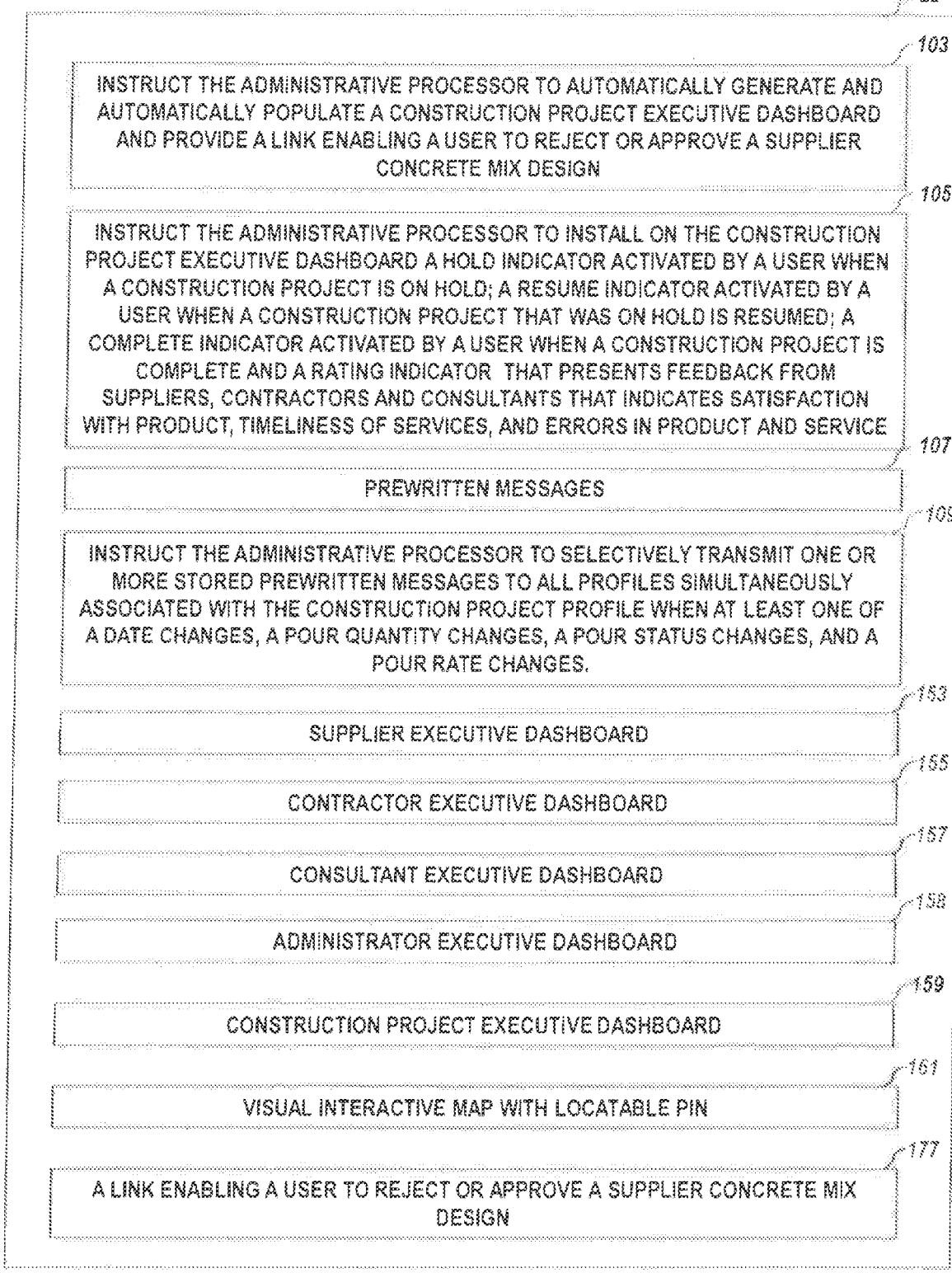

METHOD FOR SYNCHRONOUS COMMUNICATION TO PROCURE, SCHEDULE, COORDINATE, AND DELIVER MATERIALS TO A PLURALITY OF CONSTRUCTION PROJECTS AUTOMATICALLY USING A CALENDAR MODEL

CROSS REFERENCE TO RELATED APPLICATIONS

The present application claims priority to and the benefit of U.S. Provisional Patent Application Ser. No. 62/571,930 filed on Oct. 13, 2017, entitled "METHOD OF SYNCHRONOUS COMMUNICATION TO PROCURE, SCHEDULE, COORDINATE, AND DELIVER MATERIALS TO A PLURALITY OF CONSTRUCTION PROJECTS AUTOMATICALLY" (our reference 3074.001). These references are hereby incorporated in its entirety.

FIELD

The present embodiment generally relates to a method of synchronous communication to procure, schedule, coordinate, and deliver materials to a plurality of construction projects automatically using a calendar model.

BACKGROUND

A need exists for better procurement techniques for construction materials.

The present embodiments meet these needs.

BRIEF DESCRIPTION OF THE DRAWINGS

The detailed description will be better understood in conjunction with the accompanying drawings as follows:

FIG. 5A-5B depicts elements for an exemplary construction project profile according to one or more embodiments.

FIG. 6 depict elements for an exemplary administrative profile according to one or more embodiments.

FIGS. 7A-7C depicts a sequence of steps for implementing the method according to one or more embodiments.

FIGS. 8A-8B are a diagram of a usable administrative computer readable media for implementing the method according to one or more embodiments.

Figure 1:
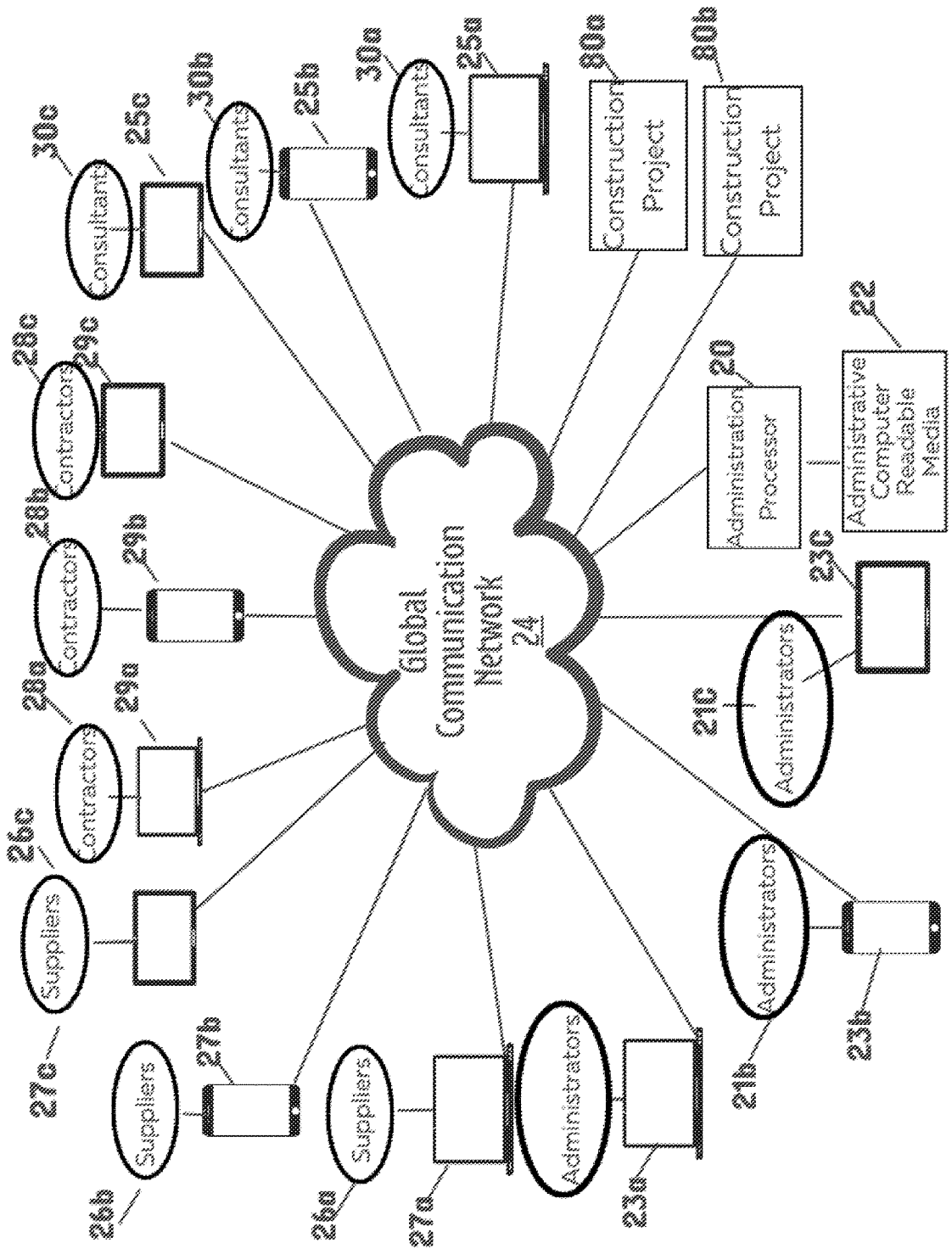
FIG. 1 depicts an overview of equipment needed in implementing the method according to one or more embodiments.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The invention relates to a method using synchronous communication to procure, schedule, coordinate, and deliver materials to a plurality of construction projects automatically using a calendar model and using an administrative processor with administrative computer readable media connected to a global communication network and client devices for a plurality of suppliers, client devices for a plurality of contractors and client devices for a plurality of consultants, all simultaneously.

The invention provides the advantage of preventing the potential for critical errors in construction materials procurement, such as sending the wrong mix of construction materials to a parking garage project and the parking garage collapses as a result of improper materials, instead, the invention attempts to stop death from such occurrences.

The invention provides the advantage of preventing an environmental toxic spill by streamlining information and quantity to a job site, by providing too much construction materials at a site, causing construction materials to be disposed of which can harm the environment and water supply.

The invention provides the advantage of preventing toxic materials leaching through concrete that was poured with the wrong admixtures.

The invention provides the benefit of making sure pour rates are correct for cast in place projects where preformed forms and shoring could otherwise collapse if the wrong pour rate is used causing death.

The invention with the calendar model enables reduced use of fossil fuels by providing the most efficient supply to a construction project location for concrete or other construction material.

The invention is for a method of synchronous communication to procure, schedule, coordinate, and deliver materials to a plurality of construction projects automatically using an administrative processor with administrative computer readable media connected to a global communication network and client devices for a plurality of suppliers, client devices for a plurality of contractors and client devices for a plurality of consultants.

The first step involves creating a supplier profile, a contractor profile, a consultant profile and a construction project profile all in a geographic database.

The method includes inserting construction materials data, files, images, and material design specifications, quantity, delivery rate, construction project site location geocodes, a predefined serviceable distance for suppliers to the construction project site location geocode, and a delivery date for construction materials into the construction project.

The method includes the step of comparing the construction project site location geocode to each supplier location geocode and generating a geographic list of supplier profiles within the predefined serviceable distance to the construction project site location geocode.

The method includes the step of: transmitting the geographic list of supplier profiles each contractor client device contact number that matches the predefined serviceable distance and comparing each delivery date required for construction materials to each contractor's current construction project dates and generating a chronological list from the geographic list of supplier profiles that have availability on a delivery date required for construction materials.

The method further includes transmitting the chronological list of supplier profiles to each contractor client device contact phone number; and matching a supplier profile to a construction project and automatically inputting supplier mix designs into each construction project.

The following terms are used herein:

The term "consultant information" refers to a name, address, cell phone number, office phone number, email, and company code, company rating, type of user as consultant indicator.

The term "contractor information" refers to a name, address, cell phone number, office phone number, email, and company code, company rating, type of user as contractor indicator.

The term "construction project information" refers to a name, address, editable construction material quantity, editable pour rate, P.S.I., analog images, digital data files, cell phone number, office phone number, email, and company code, and type of user as construction project indicator.

The term "supplier information" refers to a name, address, cell phone number, office phone number, email, and company code, company rating, type of user as supplier indicator.

Turning now to the Figures, FIG. 1 is an overall diagram of the equipment usable with the method.

FIG. 1 shows equipment usable with the method of synchronous communication to procure, schedule, and deliver materials to a plurality of construction projects 80a, 80b automatically using an administrative processor 20 with administrative computer readable media 22 connected to a global communication network 24 and client devices 27a-27c for a plurality of suppliers 26a-26c, client devices 29a-29c for a plurality of contractors 28a-28c and client devices 25a-25c for a plurality of consultants 30a-30c, and client devices 23a-23c for a plurality of administrators 21a-21c.

Figure 2:
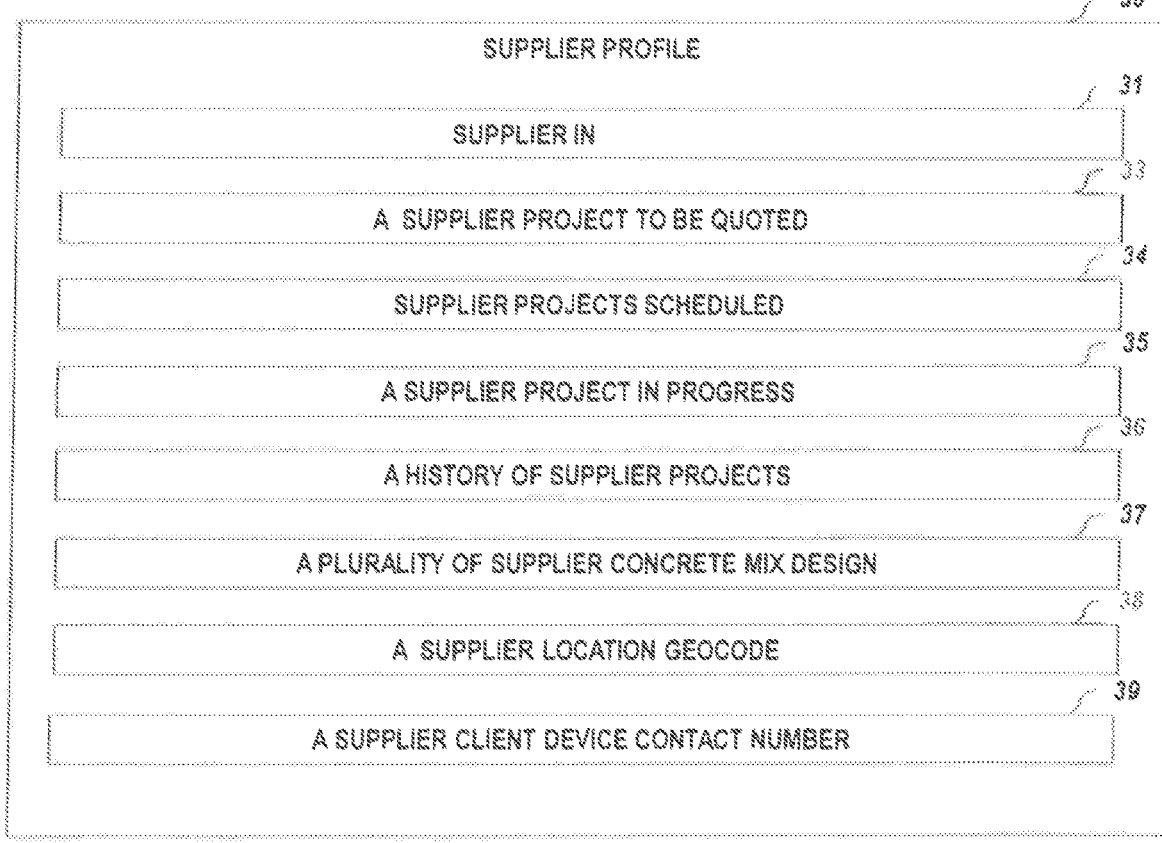
FIG. 2 depicts elements for an exemplary supplier profile according to one or more embodiments.

FIG. 2 is a diagram of a supplier profile 30 usable in the method.

The supplier profile 30 in the geographic database includes supplier information 31 such as supplier name such as Best Material Suppliers Inc.; a construction project to be quoted 33 such as New Retail Center Project; a construction projects scheduled 34 such as Town Hall Parking Lot Expansion in addition to other projects awarded to supplier; a construction project in progress 35 such as Municipal Hospital Addition; a history of construction projects 36 such as a Trinity Trail Sidewalk Improvement; a plurality of supplier mix design 37 such as 30U500BG; and such as 35U400BG which specify the formulation of the constituents used to create the construction materials; a supplier location geocode 38 such as latitude and longitude coordinate that specifies the location of the supplier's construction materials material plant; and a supplier client device contact phone number 39 such as 713-275-3400.

Figure 3:
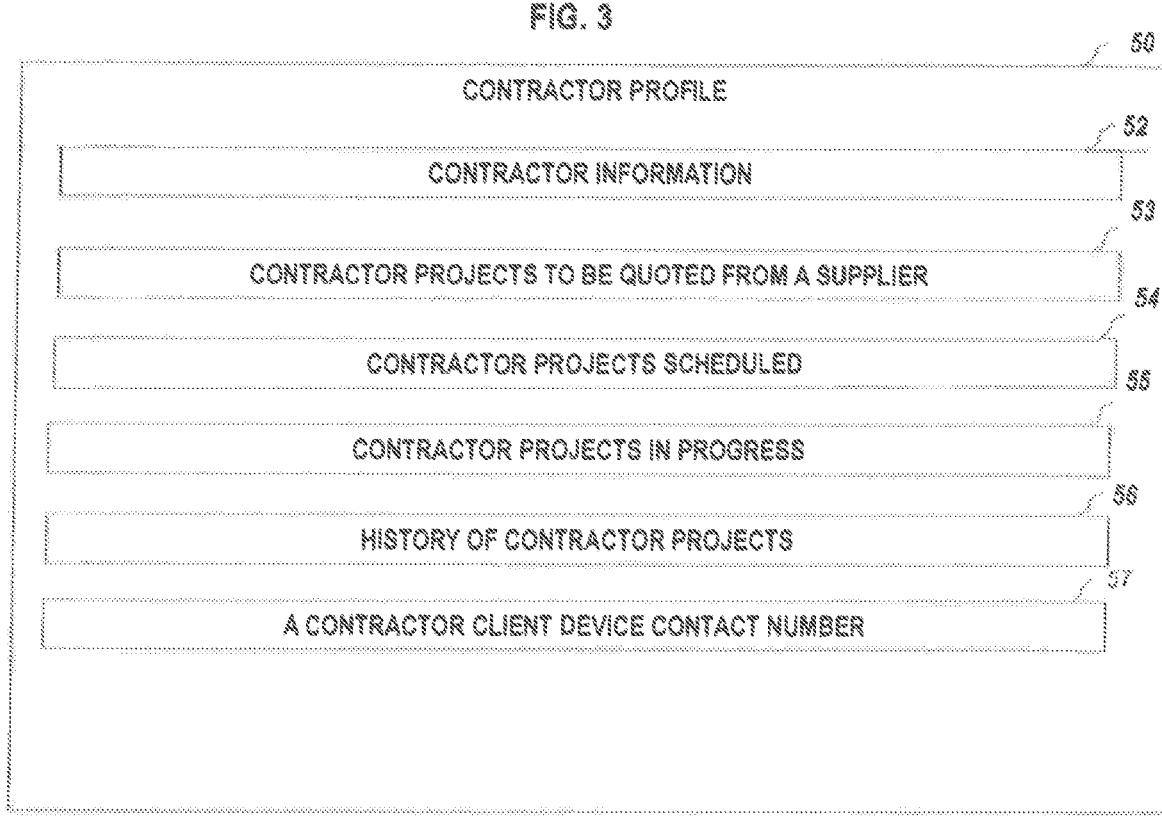
FIG. 3 depicts elements for an exemplary contractor profile according to one or more embodiments.

FIG. 3 is a diagram of a contractor profile 50 usable in the method.

A contractor profile 50 in the geographic database 40 for each of the plurality of contractors, can include contractor information such as; contractor name such as Best Contractors Inc.; a construction projects to be quoted from a supplier 53 such as; New Retail Center Project; a construction projects scheduled 54 such as Town Hall Parking Lot Expansion; a construction projects in progress 55 such as Municipal Hospital Addition; and a history of construction projects 56 such as Trinity Trail Sidewalk Improvement; and a contractor client device contact phone number 57 such as 713-403-7411.

Figure 4:
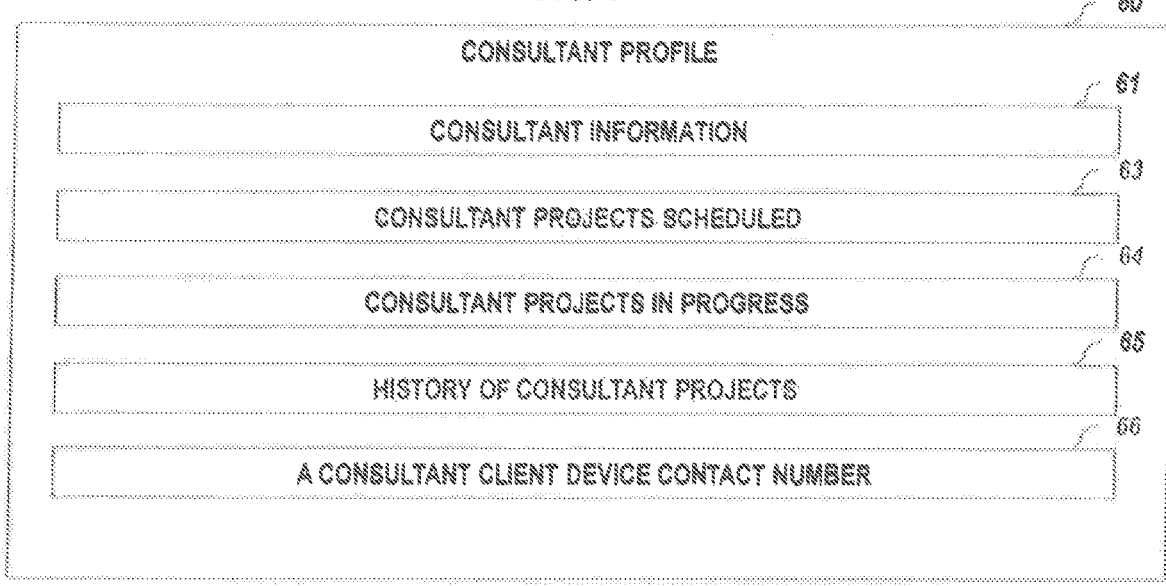
FIG. 4 depicts elements for an exemplary consultant profile according to one or more embodiments.

FIG. 4 is a diagram of a consultant profile 60 usable in the method.

Each consultant profile 60 can include consultant information 61 such as consultant name such as Best Consultants Inc.; construction projects scheduled 63 such as Town Hall Parking Lot Expansion; construction projects in progress 64 such as Municipal Hospital Addition; a history of construction projects 65 such as Trinity Trail Sidewalk Improvement; and a consultant client device contact phone number 66 such as 713-403-7411.

FIGS. 5A-5B are a diagram of a Construction Project 80.

The construction project profile 80 can be stored in the geographic database and linked to each supplier profile, and contractor profile, and contractor specified consultant profiles.

Each construction project 80 can include: construction project information 82 such as a project name such as The Falls Apartment Homes Phase I, physical location, contractor name; construction materials mix design specification 84 such as images of specification documents; a construction project site location geocode 86 such as latitude and longitude coordinate that specifies the location of the construction project location; a predefined serviceable distance for suppliers to the construction project site location geocode 88 such as 30 miles; an editable type of pour 503 such as Foundation; an editable pour rate 505 such as 30 minutes; an editable pour quantity 507 such as 35 yards; an editable delivery date 509 such as May 10, 2017; an editable delivery start time 511 such as 3:58 PM; digital images 513 such as project site entry images; analog images 514 such as project washout location images; digital data files 517 such as material design specifications; processed digital data files 519 such as construction project rear entrance with indication arrow on the construction projects; ad mixtures 521 such as flyash; pounds per square inch (psi) 522; and project specific notes 523 and project specific messages 524 such as use entrance located of the northern boundary of the project.

FIG. 6 depict elements for an exemplary administrative profile usable in the method.

The administrative profile 70 in the geographic database includes administrative information 71 such as administrative name such as Ready Set Pour; construction projects to be quoted by a supplier 70 such as New Retail Center Project; construction projects to be scheduled 73, such as Town Hall Parking Lot Expansion; construction projects in progress 74 such as Municipal Hospital Addition; a history of construction projects 75, such as Trinity Trail Sidewalk Improvements; an administrative client device contact phone number 76, such as 713-279-3500, and additional features, such as reports 91, controls 92, and profile administration 93.

FIGS. 7A-7C details the steps of the method.

The method of synchronous communication to procure, schedule, and deliver materials to a plurality of construction projects 80a, 80b automatically using an administrative processor 20 with administrative computer readable media 22 (FIG. 1) connected to a global communication network 24 and client devices 27abc for a plurality of suppliers 26abc, client devices 29abc for a plurality of contractors 28abc and client devices 25abc for a plurality of consultants 30abc, initially has the step 200 of creating at least one supplier profile 30 in a geographic database 40 of the administrative computer readable media for each of a plurality of suppliers.

Step 201 involves inputting a supplier pour rating for each supplier into each supplier profile.

Step 202 involves creating a contractor profile 50 in the geographic database 40 for each of the plurality of contractors.

Step 203 involves inputting a contractor pour rating for each contractor into each contractor profile.

Step 204 involves creating a consultant profile in the geographic database 40 for each of the plurality of consultants.

Step 205 is inputting a consultant pour rating for each consultant into each consultant profile.

Step 210 involves verifying information of each created supplier profile, contractor profile, consultant profile and inserting an account approval.

Step 220 is the step of creating a plurality of construction projects in the geographic database and linking each construction project to a contractor profile.

Step 230 involves comparing the construction project site location geocode to each supplier location geocode and generating a geographic list of supplier profiles within the predefined serviceable distance to the construction project site location geocode.

Step 240 involves transmitting the geographic list of supplier profiles each contractor profile that matches the predefined serviceable distance.

Step 250 involves comparing each delivery date required for construction materials to each contractor's current construction project dates and generating a chronological list from the geographic list of supplier profiles that have availability on a delivery date required for construction materials.

Step 252 involves transmitting the geographical list of supplier profiles to each contractor profile.

Step 254 involves transmitting the geographical list of construction projects to each supplier client profile.

Step 262 involves comparing pour ratings of each contractor profile and forming a list of contractor profiles from highest to lowest pour rating.

Step 266 involves comparing pour ratings of each supplier profile and forming a list of supplier profiles from highest to lowest pour rating.

Step 269 involves transmitting the list of supplier profiles from highest to lowest pour rating to at least one of: the plurality of consultant profiles, the plurality of contractor profiles, and the plurality of construction projects Step 270 matching a supplier profile to a construction project and automatically inputting supplier mix designs into each construction project.

Step 271 inputting a password into each profile.

Step 272 providing a verification code via text message or email to reset a password and access a profile when a user associated with a profile selects "forgot password".

Figure 8A:
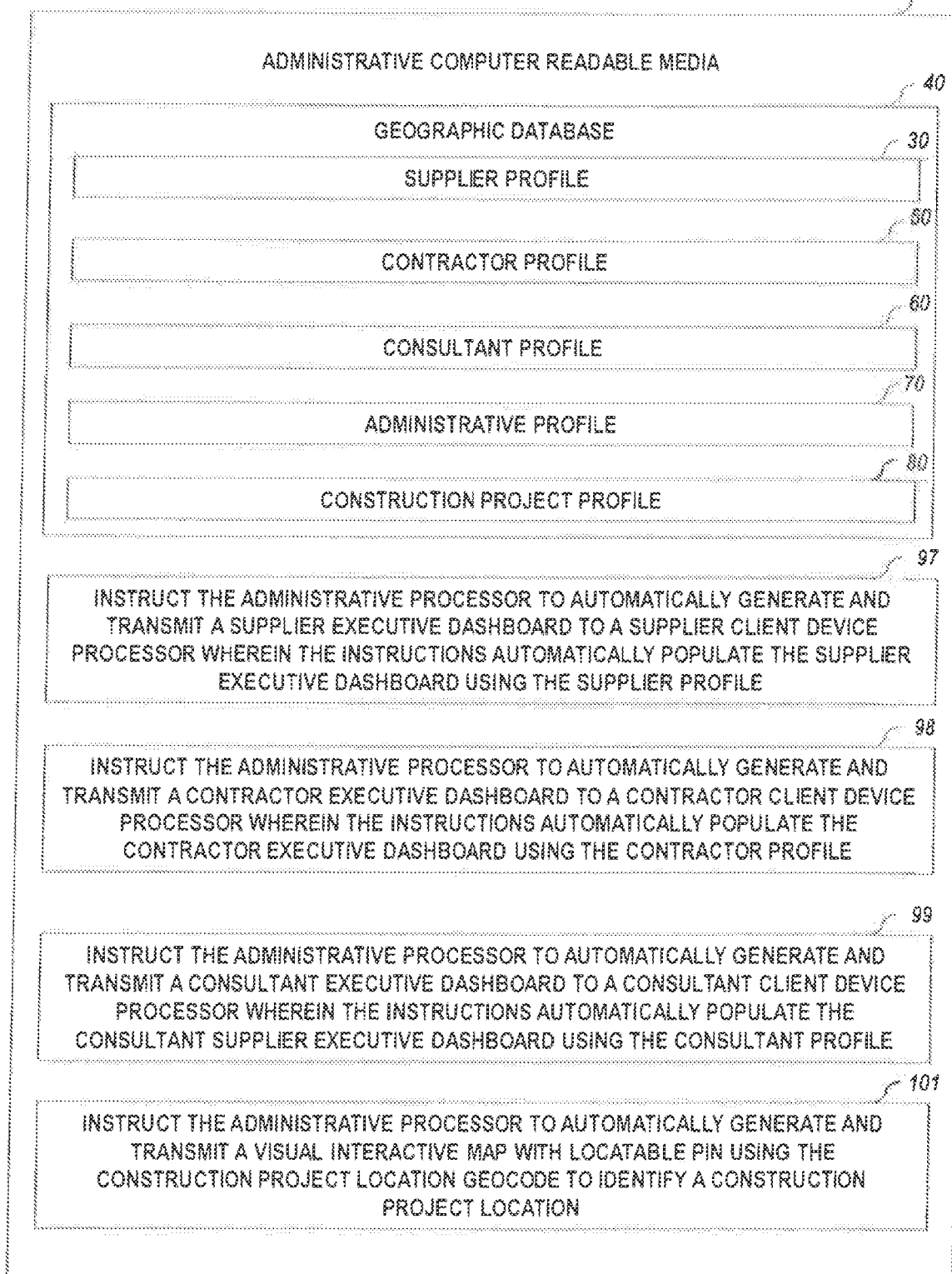

FIGS. 8A-8B depict an administrative computer readable media 22 includes a supplier profile 30, a geographic database 40, a contractor profile 50, a consultant profile 60, administrative profile 70, and a construction project 80.

The administrative computer readable media includes instructions 97 that instruct the administrative processor to automatically generate and transmit a supplier executive dashboard 153 to a supplier client device, wherein the instructions automatically populate the supplier executive dashboard using the supplier profile.

Also included are computer instructions 98 in the administrative computer readable media 22 that instruct the administrative processor to automatically generate and transmit a contractor executive dashboard 155 to a contractor client device, and wherein the instructions 98 automatically populate the contractor executive dashboard using the supplier profile and the contractor profile.

The computer instructions 99 in the administrative computer readable media 22 that instruct the administrative processor to automatically generate and transmit a consultant executive dashboard 157 to a consultant client device, and wherein the instructions automatically populate the consultant executive dashboard using the contractor profile.

The computer instructions 101 in the administrative computer readable media 22 instruct the administrative processor to automatically generate and transmit a visual interactive map with locatable pin 161 (FIG. 7B) using the construction project location geocode to identify a construction project location which includes GPS tracking capabilities.

The computer instructions 103 in the administrative computer readable media 22 instruct the administrative processor to automatically generate and automatically populate a construction project executive dashboard and provide a link enabling a user to reject or approve a supplier construction materials mix design.

The computer instructions 105 in the administrative computer readable media 22 instruct the administrative processor to automatically generate on the construction project executive dashboard 159: a hold indicator activated by a user when a construction project is on hold; a resume indicator activated by a user when a construction project that was on hold is resumed; a complete indicator activated by a user when a construction project is complete; and a rating indicator that presents feedback from suppliers, and contractors that indicates satisfaction with product, timeliness of services, and errors in product and service.

The administrative computer readable media includes a plurality of prewritten messages 107 such as "mix is ready for pick up."

The administrative computer readable media contains computer instructions 109 to instruct the administrative processor to selectively transmit one or more stored prewritten message to all profiles simultaneously associated with the construction project profile when at least one of these conditions occur; a date changes, a pour quantity changes, pour status changes, and pour rate changes.

The administrative computer readable media contains the supplier executive dashboard 153.

The administrative computer readable media contains the contractor executive dashboard 155.

The administrative computer readable media contains the consultant executive dashboard 157.

The administrative computer readable media contains the construction project executive dashboard 159.

The administrative computer readable media contains a visual interactive map with locatable pin 161.

The administrative computer readable media contains a supplier construction materials mix design 177.

Various computer instructions are in the administrative computer readable media.

Figure 9:
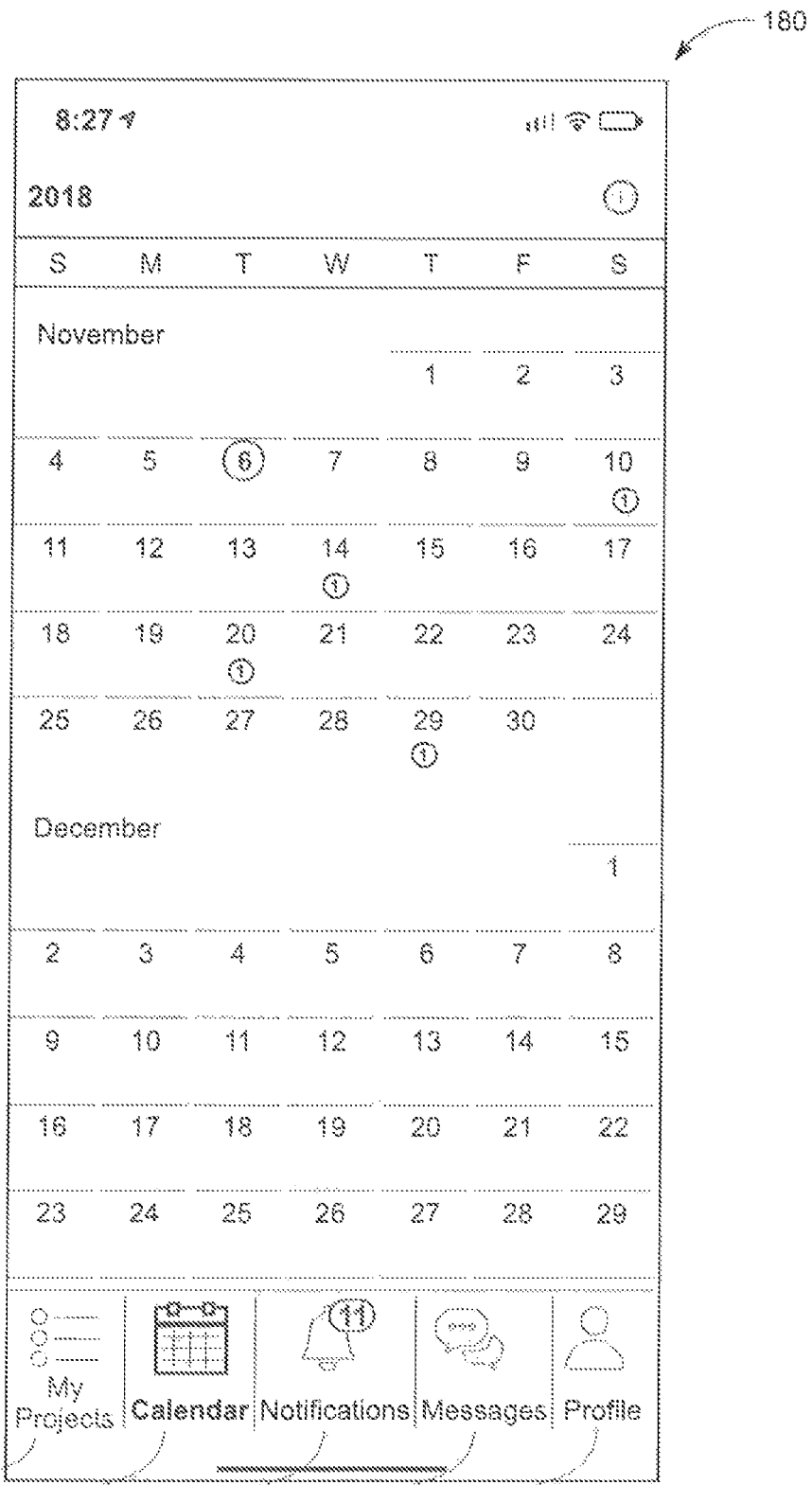
FIG. 9 depicts a view of the interactive calendar on a client device.

FIG. 9 depicts a view of the interactive calendar on a client device.

An interactive calendar screen 180 is shown in FIG. 9.

The interactive calendar is created using synchronous communication to procure, schedule, coordinate, and deliver materials to a plurality of construction projects 80a, 80b

(FIG. 1) automatically using an administrative processor 20 (FIG. 1) with administrative computer readable media 22 (FIG. 1) connected to a global communication network 24 (FIG. 1) and client devices 27*abc* for a plurality of suppliers 26*abc* (FIG. 1), client devices 29*abc* for a plurality of contractors 28*abc* (FIG. 1) and client devices 25*abc* for a plurality of consultants 30*abc* (FIG. 1).

Along the bottom of the interactive calendar screen 180 are the 'My Projects' tab 170, the 'Calendar' tab 172, the 'Notifications' tab 174, the 'Messages' tab 176, and the 'Profile' tab 178.

The tabs can be used to quickly switch from one screen to another.

Figure 10:
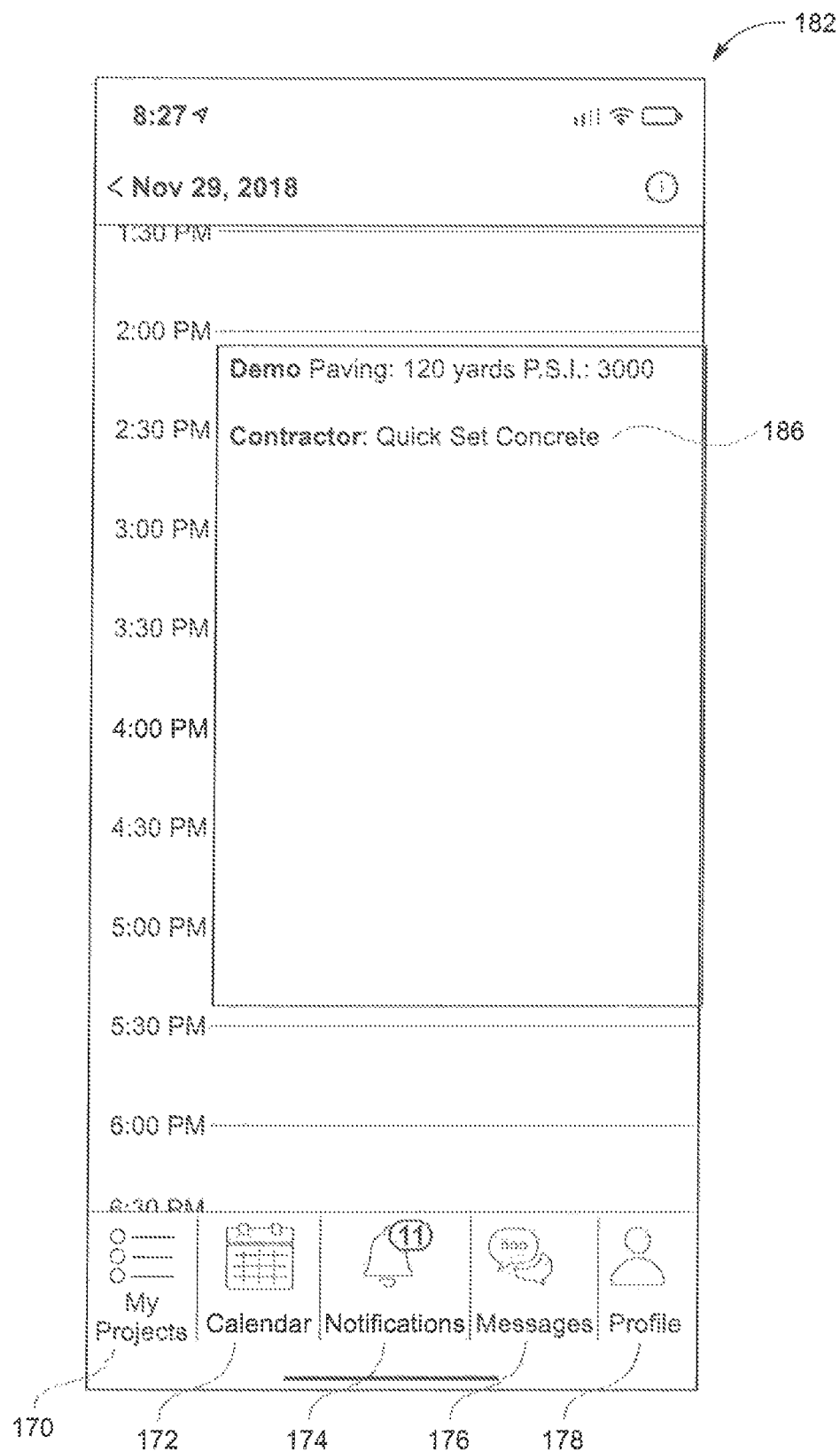
FIG. 10 depicts a view of a daily schedule.

FIG. 10 depicts a view of a daily schedule.

The daily schedule screen 182 is shown in this figure.

An example of the tasks and assigned contactor 186 are depicted in this figure as well.

Figure 11:
FIG. 11 depicts a view of the 'My Projects in Progress' screen on a client device.

FIG. 11 depicts a view of the My Projects screen on a client device.

A view of the "My Projects in Progress" screen 183 is depicted in this figure.

Also displayed here are a list of requests for quotations 185.

Figure 12:
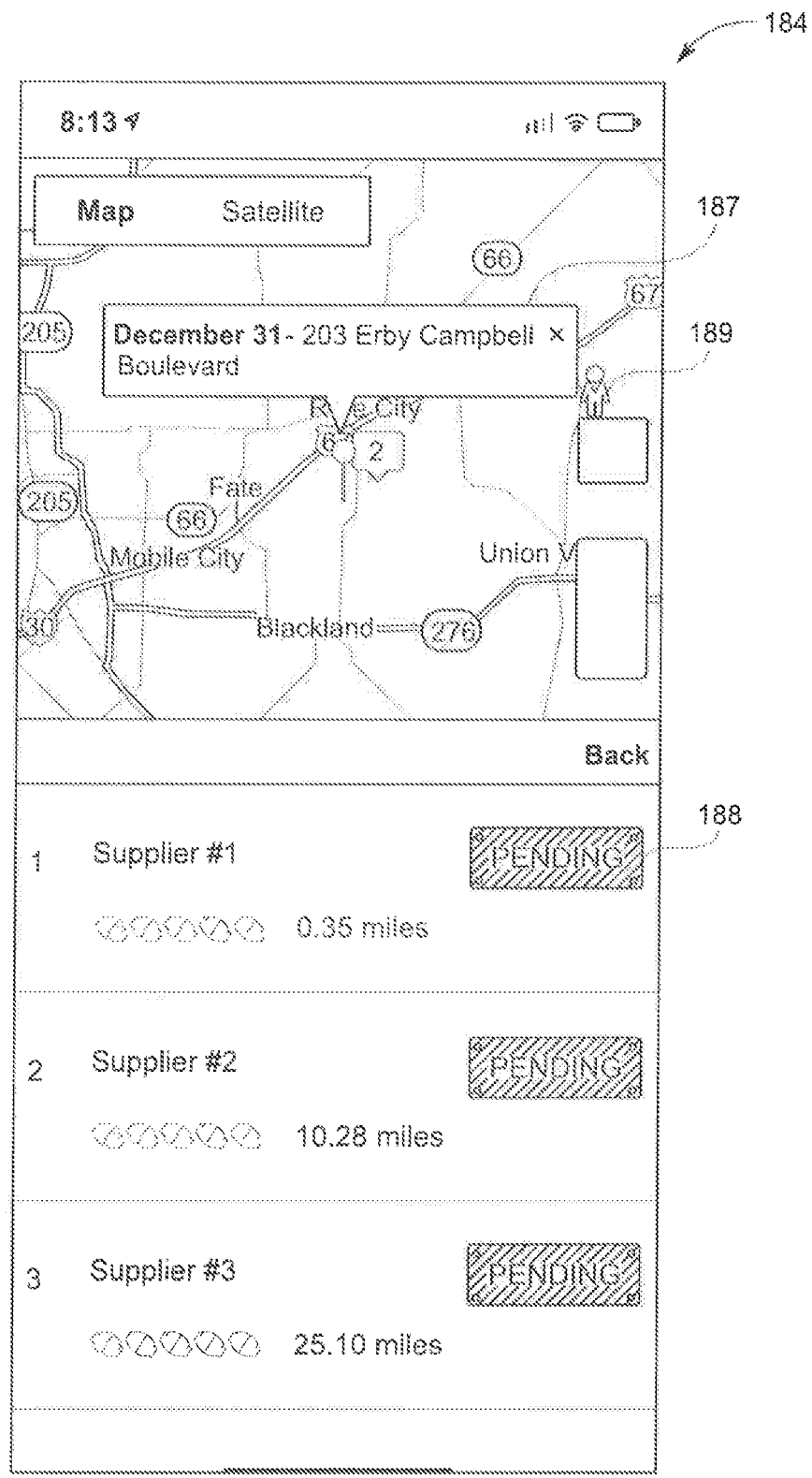
FIG. 12 depicts a view of a map with pending assignments.

FIG. 12 depicts a view of a map with pending assignments.

The map screen 184 is shown in this figure.

The map screen 184 displays upcoming assignments 187 in relation to where they are to take place along with their assigned date.

The map screen 184 also lists pending assignments 188 and includes information about how far that assignment is from the user 189.

Example 1

The invention is a method with an interactive calendar created using synchronous communication to procure, schedule, coordinate, and deliver materials to a plurality of construction projects such as Main Street Sidewalk Expansion, automatically using an administrative processor like an apache server with administrative computer readable media such as coded data connected to a global communication network like the internet and client devices such as lap top computers or mobile phones, for a plurality of suppliers like ready mixed construction materials suppliers, client devices 29*abc* for a plurality of contractors such as construction materials contractor and client devices 25*abc* for a plurality of consultants such as City inspectors, testing labs, engineers, tool rental companies, and owner's representatives.

The calendar includes a supplier profile in a geographic database such as a Cassandra™ server for each of the plurality of suppliers in the administrative computer readable media.

Each supplier profile includes supplier information like location geocodes and contact information, a supplier name such as "Billy Bob's Concrete Co.", construction projects scheduled such as new parking garage, and a construction project in progress for instance "Denton High School Addition."

Supplier profiles also includes a history of construction projects such as Denton ISD Stadium, a plurality of supplier mix designs like BG600U, a supplier location geocode for example 1234 Main St. Lewisville, Tex. 75077, a supplier client device contact phone number such as 888-867-5309, and an interactive supplier calendar of a construction project to be quoted such as Dallas City Streets, a construction projects scheduled for instance Jason's Deli Mesquite, a construction project in progress for example "Patio Extension", and a history of construction projects for instance Dallas Area Rapid Transit, Braken Elementary Parking Lot Expansion, and Taco Casa #256.

The disclosed invention also includes a contractor profile in the geographic database for each of the plurality of contractors, each contractor profile having a contractor information including contractor name such as "Mark", construction projects to be quoted from a supplier such as DFW Runway Extension, construction projects scheduled such as Trinity River Armoring Project, construction projects in progress such as Residential Foundation, a history of construction projects for instance Dallas Cowboys Headquarters Addition and L.A. Fitness Red Oak, a contractor client device contact number such as 214-555-1212, and an interactive contractor calendar of construction projects to be quoted from a supplier Wendy's White Oak construction projects scheduled Kroger #4521 construction projects in progress Denton Sidewalk Repair Contract and history of construction projects such as Retaining Wall at Jeter Rd.

The invention includes a consultant profile in the geographic database for each of the plurality of consultants. Each consultant profile includes consultant information such as consultant type, contact information, and physical location, consultant name such as Mycon Engineering, construction projects scheduled for instance Town Hall Addition, construction projects in progress for example Vista Ridge Mall New Construction, history of construction projects such as Lewisville Lake Spillway Repair and a consultant client device contact number like 972-444-8787.

The invention also includes an interactive consultant calendar of construction projects scheduled such as Rudy's Rear Patio Expansion, construction projects in progress such as John Paul's Chevrolet Dealership and history of construction projects like New Town Courthouse Building.

Each interactive consultant calendar contains verified information of each created supplier profile such as Cowtown Concrete, contractor profile, and inserting an account approval for instance account approved.

The interactive consultant calendars also have construction projects in the geographic database such as Discount Tire #352 and linking each construction project to the contractor profile, the supplier profile and the consultant profile.

Each construction project having construction project information such as Construction Project Name, construction materials material mix design specification such as U600BHG, a construction project site location geocode such as 1234 S. Mill St. Lewisville, Tex. 75077, a predefined serviceable distance for suppliers to the construction project site location geocode for example 30 miles, and a delivery date such as Jan. 21, 2019.

The invention also includes a calendar model configured to compare the construction project site location geocode to each supplier location geocode and generate a geographic list of supplier profiles within the predefined serviceable distance such as 30 miles to the construction project site location geocode.

The calendar model is also configured to transmit the geographic list of supplier profiles to each contractor profile that matches the predefined serviceable distance, and compare each delivery date required for construction materials to each construction project profile, and generate a chronological list of supplier profiles from the geographic list of supplier profiles that have availability on a delivery date required for construction materials in the construction project for example Nelson Brother's Ready Mix.

The calendar model is configured to also transmit the chronological list of supplier profiles to each contractor profile, and match a supplier profile from the chronological list of supplier profiles to a contractor profile and automatically inputting supplier mix designs such as U600BGH into each construction project profile and using a Calendar Model to simultaneously input the matched supplier profiles into each of the interactive supplier calendars, interactive consultant calendars, and interactive contractor calendars simultaneously with calculated times required in minutes, hours and days for each step of the construction materials procurement process and displaying a calendar of supplier and contractor.

While these embodiments have been described with emphasis on the embodiments, it should be understood that within the scope of the appended claims, the embodiments might be practiced other than as specifically described herein.

What is claimed is:

1. A method using synchronous communication to procure, schedule, coordinate, and deliver materials to a plurality of construction projects automatically using a calendar model and an administrative processor with administrative computer readable media connected to a global communication network and client devices for a plurality of suppliers, client devices for a plurality of contractors and client devices for a plurality of consultants, the method comprises:
   a. creating a supplier profile in a geographic database for each of the plurality of suppliers in the administrative computer readable media, each supplier profile comprising:
      (i) supplier information;
      (ii) a supplier name;
      (iii) a construction project to be quoted;
      (iv) a construction project scheduled;
      (v) a construction project in progress;
      (vi) a history of construction projects;
      (vii) a plurality of supplier material designs; and
      (viii) a supplier location geocode;
      (ix) a supplier client device contact phone number;
      (x) an interactive supplier calendar of a construction project to be quoted, a construction projects scheduled, a construction project in progress, and a history of construction projects;
   b. creating a contractor profile in the geographic database for each of the plurality of contractors, each contractor profile comprising:
      (i) contractor information including contractor name;
      (ii) construction projects to be quoted from a supplier;
      (iii) construction projects scheduled;
      (iv) construction projects in progress;
      (v) history of construction projects;
      (vi) a contractor client device contact number;
      (vii) an interactive contractor calendar of construction projects to be quoted from a supplier, a construction projects scheduled, a construction projects in progress, and a history of construction projects;
   c. creating a consultant profile in the geographic database for each of the plurality of consultants, each consultant profile comprising:
      (i) consultant information;
      (ii) consultant name;
      (iii) construction projects scheduled;
      (iv) construction projects in progress;
      (v) history of construction projects;
      (vi) a consultant client device contact phone number;
      (vii) an interactive consultant calendar of a construction projects scheduled, a construction projects in progress, and a history of construction projects; and
   d. verifying the information stored in each created supplier profile, contractor profile, and consultant profile and inserting an account approval in each created supplier profile, contractor profile, and consultant profile that is verified;
   e. creating a construction project profile in the geographic database and creating a data structure within the geographic database by linking each construction project to the contractor profile, the supplier profile or the consultant profile, each construction project comprising:
      (i) construction project information;
      (ii) construction materials material design specifications;
      (iii) a construction project site location geocode;
      (iv) a predefined serviceable distance for suppliers to the construction project site location geocode;
      (v) a delivery date;
      (vi) a delivery time;
   f. automatically causing procurement, scheduling, coordination and delivery of the construction materials on the delivery date using a Calendar Model configured to accept data from the interactive consultant calendar, the interactive contractor calendar, and the interactive supplier calendar, wherein the calendar model is configured to:
      (i) compare the construction project site location geocode to each supplier location geocode and generating a geographic list of supplier profiles within the predefined serviceable distance to the construction project site location geocode;
      (ii) transmit the geographic list of supplier profiles to each contractor client device contact number that matches the predefined serviceable distance;
      (iii) compare each delivery date required for construction materials to each construction project profile and generating a chronological list of supplier profiles from the geographic list of supplier profiles that have availability on a delivery date required for construction materials in the construction project;
      (iv) transmit the chronological list of supplier profiles to each contractor client device contact number; and
      (v) match a supplier profile from the chronological list of supplier profiles to a contractor profile and automatically inputting supplier mix designs into each construction project profile and using a Calendar Model to simultaneously input the matched supplier profiles into each of the interactive supplier calendars, interactive consultant calendars, and interactive contractor calendars simultaneously with calculated times required in minutes, hours and days for each step of the construction materials pouring process and displaying a calendar of supplier contractor, and consultant, wherein the interactive contractor calendars are customized for each contractor, the interactive supplier calendars are customized for each supplier and the interactive consultant calendars are customized for each consultant.

2. The method of claim 1, further comprising:
   a. inputting a contractor pour rating for each contractor into each contractor profile; and
   b. comparing pour ratings of each contractor profile and forming a list of contractor profiles from highest to lowest pour rating.

3. The method of claim 1, further comprising:
a. inputting a supplier pour rating for each supplier into each supplier profile; and
b. comparing pour ratings of each supplier profile and forming a list of supplier profiles from highest to lowest pour rating; and
c. transmitting the list of supplier profiles from highest to lowest pour rating to at least one of: the plurality of consultant profiles, the plurality of contractor profiles, and the plurality of construction projects.

4. The method of claim 1, further comprising:
a. inputting a password into each profile; and
b. providing a verification code via text message to reset a password and access a profile when a user associated with a profile selects "forgot password".

5. The method of claim 1, wherein the construction material mix design specification comprises at least three of: constituents of aggregate; sizes of aggregate; temperature of aggregate; type of aggregate; weight of aggregate; pour rate of aggregate; a batch rate for each type of aggregate, a cement ratio; a water ratio; a strength rating in psi; a cure rate; and a flex modulus.

6. The method of claim 1, wherein the supplier mix designs comprise at least of: calcium; silica; pigment; concrete retarder; plasticizer; fly ash; carbon fibers; and additive for increased air entrainment.

7. The method of claim 1, further comprising using instructions in the administrative computer readable media to automatically generate and transmit a supplier executive dashboard to a supplier client device, wherein the instructions automatically populate the supplier executive dashboard using the supplier's profiles and the contractors profiles.

8. The method of claim 1, wherein the interactive calendar created using synchronous communication to procure, schedule, coordinate, and deliver materials to a plurality of construction projects, and further comprising using instructions in the administrative computer readable media to automatically generate and transmit a contractor executive dashboard to a contractor client device, wherein the instructions automatically populate the contractor executive dashboard using the supplier profile and the contractor profile.

9. The method of claim 1, further comprising using instructions in the administrative computer readable media to automatically generate and transmit a consultant executive dashboard to a consultant client device, wherein the instructions automatically populate the consultant executive dashboard using the supplier's profile and the contractor's profile.

10. The method of claim 1, wherein the construction project further comprises: a project name, an editable type of pour, an editable pour rate, an editable pour quantity, an editable pour date, an editable pour start time, digital images, analog images, digital data files, processed digital data files on construction projects, ad mixtures, pounds per square inch (PSI) and project specific notes.

11. The method of claim 1, further comprising instructions in the administrative computer readable media to automatically generate and transmit a visual interactive map with locatable pin using the construction project location geocode to identify a construction project location.

12. The method of claim 1, further comprising instructions in the administrative computer readable media to automatically generate and transmit a construction project executive dashboard and provide link enabling a user to reject or approve a supplier construction materials mix specification.

13. The method of claim 1, further comprising computer instruction in the administrative computer readable media to automatically generate on the contractor executive dashboard a hold indicator activated by a user when a construction project is on hold, a resume indicator activated by a user when a construction project that was on hold is resumed, a complete indicator activated by a user when a construction project is complete, and a rating indicator that presents feedback from suppliers, contractors and consultants that indicates satisfaction with product, timeliness of services, and errors in product and service.

14. The method of claim 1, further comprising storing a plurality of prewritten messages in the administrative computer readable media and computer instructions to instruct the administrative processor to selectively transmit one or more stored prewritten message to all profiles simultaneously associated with the construction project when at least one of a date changes a pour quantity changes, material status changes, and pour rate changes.

15. The method of claim 1, further comprising creating an administrative profile in the geographic database for each of the plurality of administrators, each administrative profile comprising:
a. administrative information;
b. construction projects scheduled;
c. construction projects in progress;
d. a history of construction projects;
e. an administrative client device contact phone number;
f. reports;
g. controls; and
h. profile administration.

16. The method of claim 1, wherein the calendar model is configured to provide notifications to the supplier profile, the contractor profile, and the consultant profile when any modifications are made to a construction project with the supplier profile, the contractor profile, and the consultant profile.

* * * * *